(12) United States Patent
Renke et al.

(10) Patent No.: US 10,625,578 B2
(45) Date of Patent: Apr. 21, 2020

(54) LOCATING AND RETENTION PIN

(71) Applicant: GM GLOBAL TECHNOLOGY OPERATIONS LLC, Detroit, MI (US)

(72) Inventors: David T. Renke, Macomb, MI (US); Michael A. Faucett, Jr., Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 15/869,251

(22) Filed: Jan. 12, 2018

(65) Prior Publication Data
US 2019/0217685 A1 Jul. 18, 2019

(51) Int. Cl.
*B60J 1/00* (2006.01)

(52) U.S. Cl.
CPC ............... *B60J 1/005* (2013.01); *B60J 1/006* (2013.01)

(58) Field of Classification Search
CPC .......... B60J 1/005; B60J 1/006; E06B 3/5481
USPC ............... 296/84.1, 90, 96.21, 96.22, 146.15
See application file for complete search history.

(56) References Cited

U.S. PATENT DOCUMENTS

| 6,378,931 B1 * | 4/2002 | Kolluri | ............... B60J 1/006 296/146.15 |
| 2007/0063539 A1 * | 3/2007 | DiMario | ............... B60J 1/006 296/146.15 |

* cited by examiner

*Primary Examiner* — Joseph D. Pape

(57) ABSTRACT

An assembly includes a first panel, a second panel having an aperture therethrough, and a pin. The pin has a base and a shaft. The base is secured to the first panel and the shaft is disposed at least partially in the aperture. The pin additionally includes at least one resilient clip member having a first end and a second end. The first end is disposed within the shaft, and the second end retains the second panel in a desired position relative to the first panel. The shaft comprises a first material and the clip member comprises a second material, different from the first material.

19 Claims, 2 Drawing Sheets

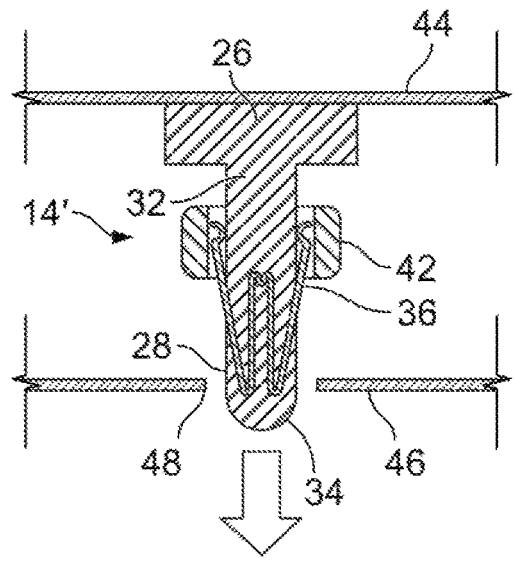
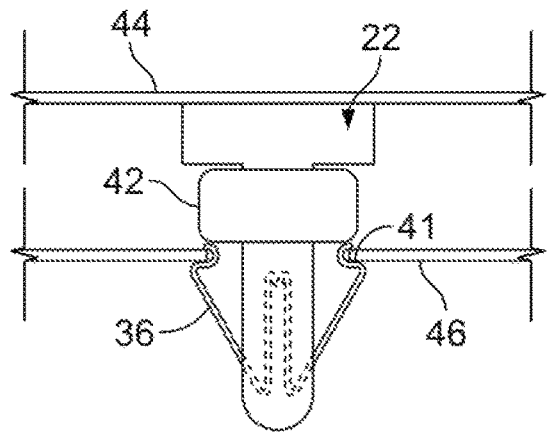
FIG. 3A          FIG. 3B
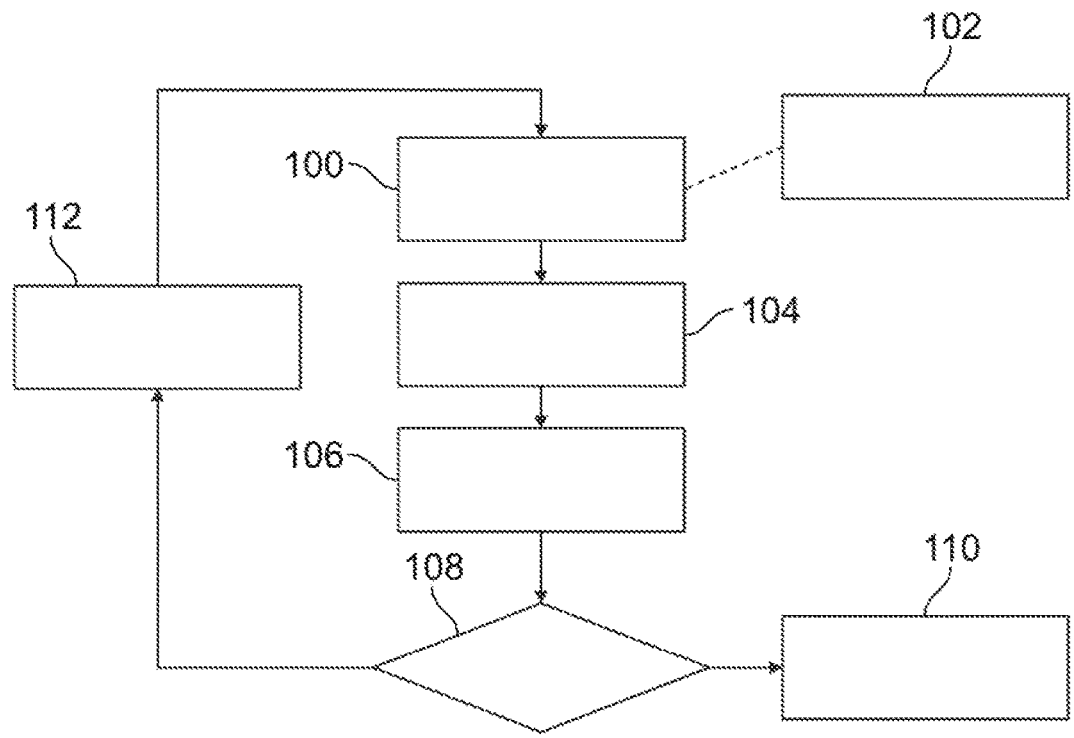
FIG. 4

LOCATING AND RETENTION PIN

TECHNICAL FIELD

The present disclosure relates to a locating and retention pin. More particularly, the present disclosure relates to a vehicle assembly having a locating and retention pin for retaining a panel, such as a pane of glass, in a desired location.

INTRODUCTION

Locator pins may be used to aid assembly of a vehicle panel by locating and retaining the panel in a desired position during at least one assembly step. Vehicle panels refer to a variety of generally flat planar components, including automotive window glass. As an example, locator pins may be used to retain the panel in a desired position while an adhesive agent applied to the panel cures.

SUMMARY

An assembly according to the present disclosure includes a first panel, a second panel having an aperture therethrough, and a pin. The pin has a base and a shaft. The base is secured to the first panel and the shaft is disposed at least partially in the aperture. The pin additionally includes at least one resilient clip member having a first end and a second end. The first end is disposed within the shaft, and the second end retains the second panel in a desired position relative to the first panel. The shaft comprises a first material and the clip member comprises a second material, different from the first material.

In an exemplary embodiment, the first panel includes a pane of window glass.

In an exemplary embodiment, the assembly further includes a grommet disposed at least partially around the shaft. The grommet may be disposed between the base and the second panel.

In an exemplary embodiment, the first material comprises nylon.

In an exemplary embodiment, the second material comprises spring steel.

In an exemplary embodiment, the clip member comprises an arcuate portion at the second end, an edge of the second panel at the aperture being retained by the arcuate portion.

A method of assembling components according to the present disclosure includes providing a component, a panel, and a pin assembly. The pin assembly has a body, at least one resilient clip member, and a grommet. The clip member has a retracted position and an extended position and is biased toward the extended position. The grommet is disposed at least partially about the body and retains the clip member in the retracted position. The panel has an aperture therethrough, with the aperture having a smaller diameter than the grommet. The method additionally includes coupling the pin assembly to the component, disposing the body at least partially in the aperture, and moving the component relative to the panel to move the grommet relative to the body to release the clip member, and engaging the clip member with the panel.

In an exemplary embodiment, the method additionally includes insert molding the clip member into the body. In such an embodiment, the clip member may contain spring steel.

In an exemplary embodiment, the method additionally includes disposing an adhesive between the component and the panel.

In an exemplary embodiment, the component includes a pane of automotive window glass.

An assembly according to the present disclosure includes a component and an elongate member. The elongate member has a first end, a second end, and a body extending from the first end to the second end, with the first end being secured to the component. The assembly additionally includes a resilient clip member having a first portion disposed within the body and a second portion projecting from the body. The clip member has a different material composition from the elongate member. The assembly also includes a panel with an aperture therethrough. The body is disposed at least partially in the aperture. The second portion retains the panel in a desired position relative to the component. The assembly further includes a grommet disposed at least partially around the body between the component and the panel.

In an exemplary embodiment, the component and the elongate member are integrally formed.

In an exemplary embodiment, the component comprises a second panel. In such an embodiment, the first end may be secured to the second panel by adhesive.

In an exemplary embodiment, the panel comprises a pane of automotive window glass.

In an exemplary embodiment, the clip member comprises spring steel.

In an exemplary embodiment, the elongate member comprises nylon.

Embodiments according to the present disclosure provide a number of advantages. For example, a locating pin assembly according to the present disclosure may be used to retain a panel in place, and moreover may do so while reducing installation effort, providing additional operator feedback that installation is complete, and providing a more robust installation solution.

The above advantage and other advantages and features of the present disclosure will be apparent from the following detailed description of the preferred embodiments when taken in connection with the accompanying drawings.

BRIEF DESCRIPTION OF THE DRAWINGS

FIGS. 3A and 3B are views of a panel assembly according to an embodiment of the present disclosure; and FIG. 4 is a flowchart representation of a method of assembly according to the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
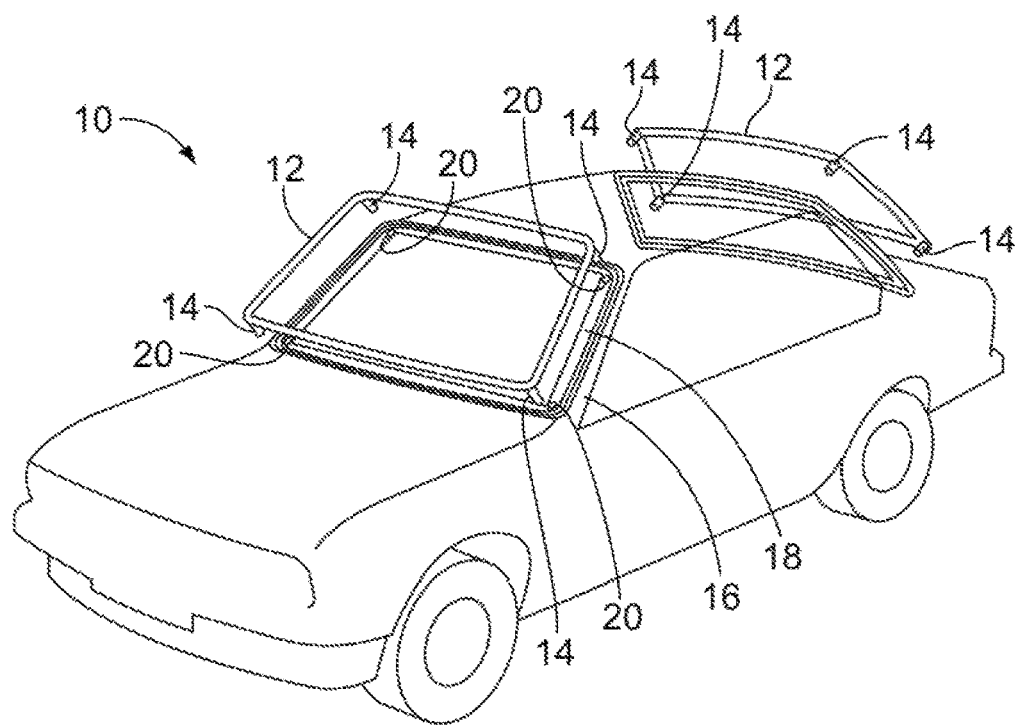
FIG. 1 is an isometric view of a vehicle assembly according to an embodiment of the present disclosure.

Referring now to FIG. 1, an automotive vehicle assembly 10 according to the present disclosure is illustrated. The vehicle assembly 10 includes at least one panel 12. In the embodiment of FIG. 1, the panels 12 include fixed sheets of window glass, e.g. a windshield and a rear window. In other embodiments, the at least one panel may include other sheets of fixed glass such as a fixed sunroof, or panels made of other materials such as plastics.

At least one locator pin 14 is associated with the at least one panel 12. In the exemplary embodiment of FIG. 1, locator pins 14 are disposed at respective corners of each panel 12. However, in other embodiments, a different number of pins 14 may be provided, the location of the pins 14 may be other than as illustrated, or both. The configuration of the pins 14 will be discussed in further detail below.

The vehicle assembly 10 also includes at least one frame 16 having a mating surface 18. The mating surface 18 may be defined by an outer surface of an additional panel, as will be discussed in further detail below. The mating surface 18 is shaped to interface with a corresponding surface of the panel 12. The mating surface 18 is provided with at least one orifice 20. The orifice or orifices 20 correspond in number, size, and location to the pin or pins 14, such that insertion of the pin or pins 14 into the corresponding orifice or orifices 20 aligns the panel 12 into a desired position relative to the frame 16. The panel 12 may thus be maintained in a desired position until secured to the mating surface 18, e.g. by curing an adhesive disposed between the panel 12 and the mating surface 18.

Figure 2:
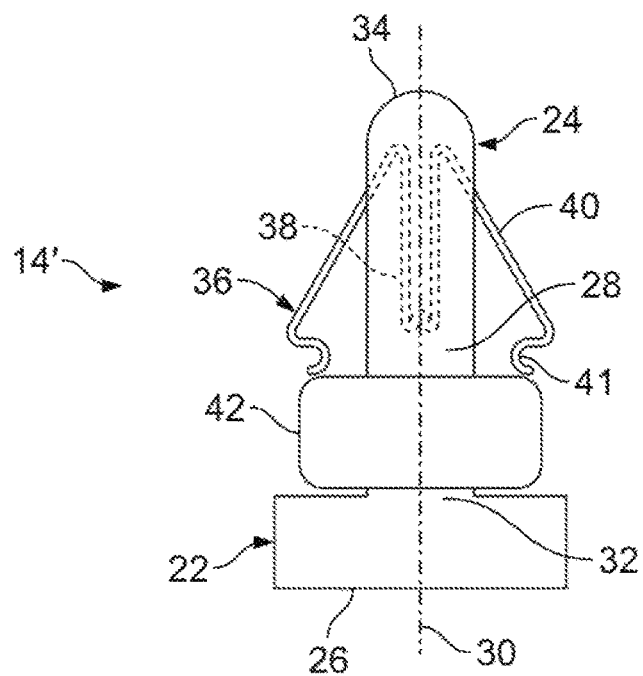
FIG. 2 is a side view of a pin assembly according to an embodiment of the present disclosure.

Referring now to FIG. 2, a pin assembly 14' according to the present disclosure is illustrated. The pin assembly 14' includes a base portion 22 and a pin portion 24. The base portion 22 and the pin portion 24 are illustrated as integral pieces in the embodiment of FIG. 2, but in alternate embodiments may be distinct and separable pieces.

The base portion 22 has a mounting portion 26. The mounting portion 26 is adapted to be secured to a panel, e.g. as illustrated in FIG. 1. In the embodiment of FIGS. 3A and 3B the mounting portion is generally flat and planar. However, in other embodiments the mounting portion 26 may have other shapes, e.g. contoured to interface with a curved panel.

The pin portion 24 includes an elongate body 28 extending along a central axis 30 from a proximal end 32 to a distal end 34. The elongate body 28 comprises a relatively rigid material, e.g. a molded thermoplastic material such as nylon. The proximal end 32 is secured to the base portion 22. For assembly of a panel to a frame, e.g. a pane of automotive glass to a vehicle frame, the mounting portion 26 may be secured to a panel such that the pin portion 24 protrudes from the panel in the fashion illustrated in FIG. 1. This may be performed by application of adhesive between the mounting portion 26 and the panel, or by other appropriate means as understood by one of ordinary skill in the art.

At least one resilient arm member 36 extends from the body 28 between the proximal end 32 and the distal end 34. The arm members 36 comprise a resilient material, e.g. spring steel, having a different structural composition than the elongate body 28. The arm members 36 comprise at least one embedded portion 38 which is secured within the elongate body 28 and at least one free portion 40 which protrudes from the elongate body 28. The arm members 36 are biased toward an undeflected position in which the free portion 40 projects away from the elongate body 28, as illustrated in FIG. 2, but may be resiliently deflected toward the body 28 during insertion into an orifice, as will be discussed in further detail below. In the embodiment illustrated in FIG. 2, the pin assembly 14' includes a contiguous arm member 36 with one embedded portion 38 and two free portions 40 projecting from opposing sides of the elongate body 28. However, other embodiments may include different arrangements of arm members in different numbers and/or locations. The free portions 40 are provided with engagement portions 41 for engaging with a panel, as will be discussed in further detail below. In the embodiment illustrated in FIG. 2, the engagement portions 41 comprise arcuate regions which may retain an edge of a panel therein. However, in other embodiments, the engagement portions 41 may have other configurations.

A grommet 42 is disposed about the elongate body 28. The grommet 42 comprises a generally annular ring-shaped body. The grommet 42 may provide a seal between an orifice and the base portion 22, as will be discussed in further detail below. The grommet 42 may also assist in installation of the pin assembly 14', as will be discussed in further detail below. In an exemplary embodiment, the grommet 42 comprises a natural or synthetic rubber material.

Referring now to FIGS. 3A and 3B, a panel assembly and method of construction thereof are illustrated. The mounting portion 26 of the pin assembly 14' is coupled to a first panel 44, e.g. by adhesive. In an exemplary embodiment the first panel 44 comprises a pane of laminated glass; however, in other embodiments the first panel 44 may comprise other materials.

As illustrated in cross-section in FIG. 3A, prior to installation, the grommet 42 is disposed about a central region of the elongate body 28 between the proximal end 32 and the distal end 34. In this configuration, the grommet 42 deflects and retains the arm member or members 36 against the body 28.

The first panel 44 and pin assembly 14' are disposed in a desired position and orientation relative to a second panel 46. The second panel 46 is provided with an aperture 48 therethrough. The aperture 48 has a diameter which is less than an outer diameter of the grommet 42. In an exemplary embodiment, the second panel 46 comprises a body panel of the vehicle, e.g. sheet metal.

The distal end 34 of the pin assembly 14' is inserted into the aperture 48, as illustrated by the arrow, e.g. in a direction generally parallel to the central axis 30. The pin assembly 14' may be freely inserted into the aperture 48 until the grommet 42 contacts the second panel 46. Upon further insertion of the pin assembly 14' into the aperture 48, the second panel drives the grommet 42 toward the proximal end 32.

As illustrated in FIG. 3B, when the grommet 42 is driven toward the proximal end 32, the arm members 36 may be released from the grommet 42 and may return to the undeflected positions. The engagement portions 41 may thereby engage with the second panel 46 to retain the second panel 46 in a desired position relative to the pin assembly 14' and, in turn, in a desired position relative to the first panel 44.

In an exemplary embodiment, the grommet 42 is sized such that, upon engagement of the engagement portions 41 with the second panel 46, the grommet 42 is secured between the base portion 22 and the second panel 46 to form a seal therebetween. As an example, the thickness of the grommet 42 along the central axis 30 may be slightly greater than the space between the engagement portions 41 and the base portion 22 along the central axis 30, such that the grommet 42 is slightly compressed when the engagement portions 41 engage with the second panel 46.

In some embodiments, an adhesive may be provided between the first panel 44 and the second panel 46, e.g. by disposing a layer of adhesive on the second panel 46 prior to insertion of the pin assembly 14' into the aperture 48. However, in other embodiments within the scope of the present disclosure, no adhesive is applied. Other embodiments may include additional Advantageously, this configuration may reduce the effort required by an installer to install a pin relative to known configurations, because the arm members 36 may more easily slide through the aperture 48 while retained by the grommet 42. Moreover, upon release of the arm members 36 from the grommet 42 and subsequent engagement of the engagement portions 41 with the second panel 46, an audible click may result, providing an installer an indication that assembly is successful.

As an additional advantage, clip assemblies according to the present disclosure may be easily adapted to a variety of applications. As an example, a common pin design may be used in conjunction with a plurality of different arm members having different sizes, to thereby accommodate different aperture sizes.

In an exemplary embodiment, the arm members may be insert-molded into the body of the pin assembly. Advantageously, in such an embodiment, the position of the arm members relative to the body of the pin may be shimmed or otherwise adjusted as needed to account for manufacturing variations, thereby enabling responsive changes in pin configuration when necessary.

Referring now to FIG. 4, a method of assembly according to the present disclosure is illustrated in flowchart form. The method begins at block 100 with providing a first panel, a locating pin assembly, and a second panel. The locating pin assembly has a pin body with a first material composition, at least one arm member with a second material composition, and a grommet retaining the arm members against the pin body. In an exemplary embodiment, this configuration is generally similar to the assembly illustrated in FIG. 3A. The locating pin assembly is secured to the first panel, e.g. via adhesive. The second panel has an orifice for receiving a locating pin assembly. An adhesive is provided on the second panel.

Providing a locating pin assembly may include insert-molding the locating pin assembly, as illustrated in block 102. In such embodiments, the arm member, which may be formed of spring steel or other similarly resilient material, is inserted into a mold prior to injection of the material, e.g. nylon or other materials as discussed above, for the body of the pin.

The locating pin assembly is disposed proximate the orifice to locate the first panel in a desired position relative to the second panel, as illustrated at block 104.

The locating pin assembly is inserted into the orifice, as illustrated at block 106. The grommet is driven along the pin body to release the arm members, which then engage with the second panel. In an exemplary embodiment, this configuration is generally similar to the assembly illustrated in FIG. 3B.

A determination is made of whether an adjustment to the locating pin assembly configuration is needed, as illustrated at operation 108. This determination may be based on, for example, a misalignment between the first panel and the second panel relative to a desired position or orientation, or a gap between the first panel and second panel which is larger or smaller than desired.

If the determination of operation 108 is negative, i.e. that no adjustment is needed, then any finishing steps are performed, as illustrated at block 110. This may occur, for example, curing adhesive between the first panel and second panel, providing additional fasteners if desired, and/or any additional finishing steps.

If the determination of operation 108 is positive, i.e. that adjustment is needed, then at least one new locating pin assembly having the new configuration is manufactured, as illustrated at block 112. This may include, for example, providing a shim in the insert molding process to modify the position of the arm member relative the pin body. The algorithm then returns to block 100 and a new assembly of first panel, second panel, and new locating pin assembly is constructed.

While the above has been described in the context of assemblies of first and second panels, such as a pane of automotive window glass to a body panel of a vehicle, one of ordinary skill in the art will appreciate that pin assemblies and assembly methods within the scope of the present disclosure may be used to join other types of components. As a non-limiting example, a molded plastic component may be provided with integrally-formed pin members having insert-molded arm members generally as discussed above.

As may be seen, the present disclosure provides a system and method for assembling a panel, such as a pane of glass, to a frame component. Systems and methods according to the present disclosure may be used to retain a panel in place, and moreover may do so while reducing installation effort, providing additional operator feedback that installation is complete, and providing a more robust installation solution.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly comprising:
   a first panel;
   a second panel having an aperture therethrough; and
   a pin having a base and a shaft, the base being secured to the first panel and the shaft being disposed at least partially in the aperture, the pin additionally including at least one resilient clip member having a first end and a second end, the first end being disposed within the shaft, the second end retaining the second panel in a desired position relative to the first panel, wherein the shaft comprises a first material and the clip member comprises a second material, different from the first material.

2. The assembly of claim 1, wherein the first panel includes a pane of window glass.

3. The assembly of claim 1, further comprising a grommet disposed at least partially around the shaft.

4. The assembly of claim 3, wherein the grommet is disposed between the base and the second panel.

5. The assembly of claim 1, wherein the first material comprises nylon.

6. The assembly of claim 1, wherein the second material comprises spring steel.

7. The assembly of claim 1, wherein the clip member comprises an arcuate portion at the second end, an edge of the second panel at the aperture being retained by the arcuate portion.

8. A method of assembling panels comprising:
providing a component, a panel, and a pin assembly, the pin assembly having a body, at least one resilient clip member with a retracted position and an extended position and being biased toward the extended position, and a grommet disposed at least partially about the body and retaining the clip member in the retracted position, the panel having an aperture therethrough, the aperture having a smaller diameter than the grommet;
coupling the pin assembly to the component;
disposing the body at least partially in the aperture;
moving the component relative to the panel to move the grommet relative to the body to release the clip member; and
engaging the clip member with the panel.

9. The method of claim 8, further comprising insert molding the clip member into the body.

10. The method of claim 9, wherein the clip member comprises spring steel.

11. The method of claim 8, further comprising disposing an adhesive between the component and the panel.

12. The method of claim 8, wherein the component includes a pane of automotive window glass.

13. An assembly comprising:
a component;
an elongate member having a first end, a second end, and a body extending from the first end to the second end, the first end being secured to the component;
a resilient clip member having a first portion disposed within the body and a second portion projecting from the body, the clip member having a different material composition from the elongate member;
a panel having an aperture therethrough, the body being disposed at least partially in the aperture, the second portion retaining the panel in a desired position relative to the component; and
a grommet disposed at least partially around the body between the component and the panel.

14. The assembly of claim 13, wherein the component and the elongate member are integrally formed.

15. The assembly of claim 13, wherein the component comprises a second panel.

16. The assembly of claim 15, wherein the first end is secured to the second panel by adhesive.

17. The assembly of claim 13, wherein the panel comprises a pane of automotive window glass.

18. The assembly of claim 13, wherein the clip member comprises spring steel.

19. The assembly of claim 18, wherein the elongate member comprises nylon.

* * * * *